(12) United States Patent
Heydel et al.

(10) Patent No.: US 11,708,008 B2
(45) Date of Patent: Jul. 25, 2023

(54) ELECTRIC POWERTRAIN WITH MULTI-PACK BATTERY SYSTEM AND MUTUALLY-EXCLUSIVE 3-WAY CONTACTOR

(71) Applicant: GM GLOBAL TECHNOLOGY OPERATIONS LLC, Detroit, MI (US)

(72) Inventors: Robert J. Heydel, Clawson, MI (US); Christopher Schlaupitz, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 17/035,993

(22) Filed: Sep. 29, 2020

(65) Prior Publication Data
US 2022/0097563 A1    Mar. 31, 2022

(51) Int. Cl.
 B60L 58/19    (2019.01)
 H02J 7/00    (2006.01)
 B60L 58/21    (2019.01)

(52) U.S. Cl.
 CPC ............... B60L 58/19 (2019.02); B60L 58/21 (2019.02); H02J 7/0024 (2013.01); B60L 2240/547 (2013.01)

(58) Field of Classification Search
 CPC .... B60L 58/19; B60L 58/21; B60L 2240/547; H02J 7/0024
 USPC .......................................................... 318/139
 See application file for complete search history.

(56) References Cited

U.S. PATENT DOCUMENTS

| | | | |
|---|---|---|---|
| 2006/0071557 A1 | 4/2006 | Osawa et al. | |
| 2007/0052295 A1 | 3/2007 | Frucht | |
| 2018/0269542 A1 | 9/2018 | Muenzel et al. | |
| 2019/0176803 A1 | 6/2019 | Tabatowski-Bush et al. | |
| 2019/0225109 A1 | 7/2019 | Ono et al. | |
| 2019/0283611 A1* | 9/2019 | Conlon ................... | B60L 53/14 |
| 2019/0288528 A1* | 9/2019 | Greetham ............... | B60L 58/19 |

(Continued)

FOREIGN PATENT DOCUMENTS

| | | |
|---|---|---|
| CN | 202405823 U | 8/2012 |
| CN | 105576738 A | 5/2016 |
| CN | 205768708 U | 12/2016 |

(Continued)

*Primary Examiner* — Daniel Kessie
*Assistant Examiner* — Dru Parries
(74) *Attorney, Agent, or Firm* — Quinn IP Law

(57) ABSTRACT

A battery system for a motor vehicle or other system includes a voltage bus with positive and negative bus rails, and first and second battery packs. The battery packs are arranged between and connected to rails. High-voltage switches are collectively configured to selectively interconnect the battery packs in a series or parallel battery arrangement. The switches include a pair of mutually-exclusive three-way/two-position contactors each having a series connection position and parallel connection position corresponding to the respective series and parallel battery arrangements. An electric powertrain includes an electrical load connected to the battery system, and a controller coupled to the switches. In response to a battery mode selection signal, the controller selectively transitions the contactors from the series connection position to the parallel connection position, or vice versa. A motor vehicle includes road wheels, a body, and the electric powertrain.

18 Claims, 5 Drawing Sheets

(56) References Cited

U.S. PATENT DOCUMENTS

2020/0070667 A1    3/2020  Wang et al.
2021/0257843 A1*   8/2021  Mituta .................... B60L 58/12

FOREIGN PATENT DOCUMENTS

| CN | 107851521 A | 3/2018 |
| CN | 110071536 A | 7/2019 |
| CN | 110875616 A | 3/2020 |
| CN | 111605428 A | 9/2020 |

* cited by examiner

| | SA1 | 40 | SA3 | 140 | SB2 | SB3 |
|---|---|---|---|---|---|---|
| PSA | X | 1-3 | O | 1-3 | X | O |
| DCFC-S | O | 1-2 | X | 1-2 | O | X |
| DCFC-P | X | 1-3 | X | 1-3 | X | X |

ELECTRIC POWERTRAIN WITH MULTI-PACK BATTERY SYSTEM AND MUTUALLY-EXCLUSIVE 3-WAY CONTACTOR

The present disclosure relates to electric powertrains of the types used for propulsion functions aboard battery electric vehicles ("BEVs"), hybrid electric vehicles ("HEVs"), and other high-voltage mobile platforms. An electric powertrain typically includes one or more polyphase/alternating current ("AC") rotary electric machines constructed from a wound stator and a magnetic rotor. Individual phase leads of the electric machine are connected to a power inverter, which in turn is connected to a direct current ("DC") voltage bus. When the electric machine functions as a traction motor, control of the ON/OFF switching states of semiconductor switches located within the power inverter is used to generate an AC output voltage at a level suitable for energizing the electric machine. The energized phase windings ultimately produce a rotating magnetic field with respect to the stator. The rotating stator field interacts with a rotor field to produce machine rotation and motor output torque.

A multi-cell DC battery forms a core part of a rechargeable energy storage system (RESS) aboard a modern BEV, HEV, or another mobile high-voltage mobile platform. The battery, which is connected to the DC voltage bus, may be selectively recharged by an off-board charging station. When the charging station produces a charging voltage having an AC waveform, an AC-DC converter located aboard the particular platform being charged converts the AC charging waveform to a DC waveform suitable for charging the constituent battery cells of the battery. Alternatively, a DC fast-charging ("DCFC") station may be used as a relatively high-power/high-speed charging option.

Future electric powertrain applications contemplate high-power charging and high-power propulsion electrical loading. Higher voltages provide the opportunity to meet these power requirements without increasing electrical current, which in turn enables use of smaller components such as bus bars, cables, contactors, etc. In order to meet the increasingly demanding power requirements, onboard electrical systems may be configured to switch its constituent battery packs between parallel and series arrangements as needed, e.g., to accommodate higher DC fast-charging voltages.

SUMMARY

An electric powertrain is disclosed herein includes a reconfigurable multi-pack battery system. While "multi-pack" in the provided examples entails two battery packs, the present teachings may be extended to three or more battery packs in other embodiments. Size, weight, and other manufacturing and engineering considerations will limit the actual number of battery packs, and therefore the exemplary two-pack configuration is intended to be representative of a practical configuration.

The multiple battery packs are connectable in a parallel-connected configuration ("P-configured") during propulsion operations, and in either a P-configured or series-connected configuration ("S-configured") during charging operations. For example, the P-configuration could provide for nominal 400V propulsion or charging operations in a non-limiting example embodiment, with the S-configuration in such a construction situationally enabling nominal 800V charging operations. The disclosed multi-pack architecture also enables flexible use of a DC fast-charging station for improved utilization of the station's available charging capability.

The electric powertrain described herein includes an electrical system having multiple battery packs that are selectively connectable in the S-configured or P-configured arrangements as noted above. In a simplified embodiment, the electrical system includes two battery packs, i.e., separate first and second battery packs. As such, the S-configured arrangement allows charging operations to occur at twice the first voltage level. The present solution may incorporate a pair of three-way/two-position automotive-grade contactors into circuit paths interconnecting the first and second battery packs, thereby establishing mutually-exclusive series and parallel connection possibilities.

That is, the three-way/two-position contactors have three electrical terminals: a base terminal, a series connection terminal, and a parallel connection terminal, with the structure of the contactor ensuring that the series and parallel connection terminals are physically unable to connect to each other. That is, even in the event of a welded contactor failure mode at one of the electrical terminals, e.g., the series connection terminal, it remains physically impossible to connect to the other electrical terminal, in this instance the parallel connection terminal. In addition to the resulting reduction in possible electrical failure modes, the present solution allows a single three-way/two-position contactor in each of the battery packs to perform the function of a pair of two-way/two-position contactors, thereby reducing component count and minimizing circuit control complexity.

In a non-limiting exemplary embodiment, the battery system includes a voltage bus having positive and negative bus rails, as well as first and second battery packs. The battery packs are arranged between and connected to the positive and negative bus rails. The battery system includes a plurality of switches collectively configured to selectively interconnect the battery packs in a series or a parallel battery arrangement, i.e., the above-noted S-configured and P-configured arrangements. The switches include a pair of three-way/two-position contactors each having a series connection position and parallel connection position corresponding to the series battery arrangement and the parallel battery arrangement, respectively.

The pair of three-way/two-position contactors may include a first three-way/two-position contactor arranged between the first battery pack and the negative bus rail, and a second three-way/two-position contactor arranged between the second battery pack and the positive bus rail. An electrical terminal of the first three-way/two-position contactor may be connected to or disconnected from a corresponding electrical terminal of the second three-way/two-position contactor when the first three-way/two-position contactor and the second three-way/two-position contactor are in the series connection position and the parallel connection position, respectively.

A charge coupler may be used in some embodiments to connect the battery system to an offboard charging station during a predetermined fast-charging event. In such an embodiment, the switches may include a two-way/two-position pre-charge switch arranged between the first battery pack and the positive bus rail, a first two-way/two-position switch arranged in parallel with the pre-charge switch, and a second two-way/two-position switch arranged between the first battery pack and the charge coupler.

The switches may also include an additional pre-charge switch arranged between the second battery pack and the positive bus rail, a third two-way/two-position switch arranged in parallel with the second three-way/two-position contactor, and a fourth two-way/two-position switch arranged between the second battery pack and the negative bus rail.

Inclusive of the pair of the three-way/two-position contactors, the battery system may include a total of eight of the switches.

A controller may be coupled to the switches and configured, in response to a battery mode selection signal, to selectively transition the pair of three-way/two-position contactors from the series connection position to the parallel connection position, or vice versa.

In a non-limiting embodiment, the first and second battery packs each have a corresponding voltage of about 400-500V or more, such that the battery system in the P-configuration has a voltage capability of about 800-1000V or more. Other voltages may be contemplated herein, and thus the 400V/800V example is intended to be illustrative of just one possible beneficial configuration suitable, e.g., for vehicle powertrain operations.

In that vein, an electric powertrain is also disclosed herein having an electrical load, the battery system, and a controller. The controller is coupled to the switches and configured, in response to a battery mode selection signal, to selectively transition the pair of three-way/two-position contactors from the series connection position to the parallel connection position, or vice versa.

A motor vehicle is also disclosed herein having road wheels coupled to a vehicle body of the moto vehicle, an electrical load, the battery system, and the controller. The electrical load may include, in this particular embodiment, a power inverter module (PIM) and a polyphase electric machine, the latter being connected to the PIM and to one or more of the road wheels. The battery system, which is connectable to the electrical load, includes a charge coupler configured to connect to an offboard charging station during a DC fast-charging event, a DC voltage bus having a positive bus rail and a negative bus rail, first and second battery packs, and the switches noted above, including the pair of three-way/two-position contactors each having a series connection position and a parallel connection position each driving the polyphase electric machine. The controller is coupled to the switches and configured, in response to a battery mode selection signal, to selectively transition the pair of three-way/two-position contactors from the series connection position to the parallel connection position, or vice versa.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
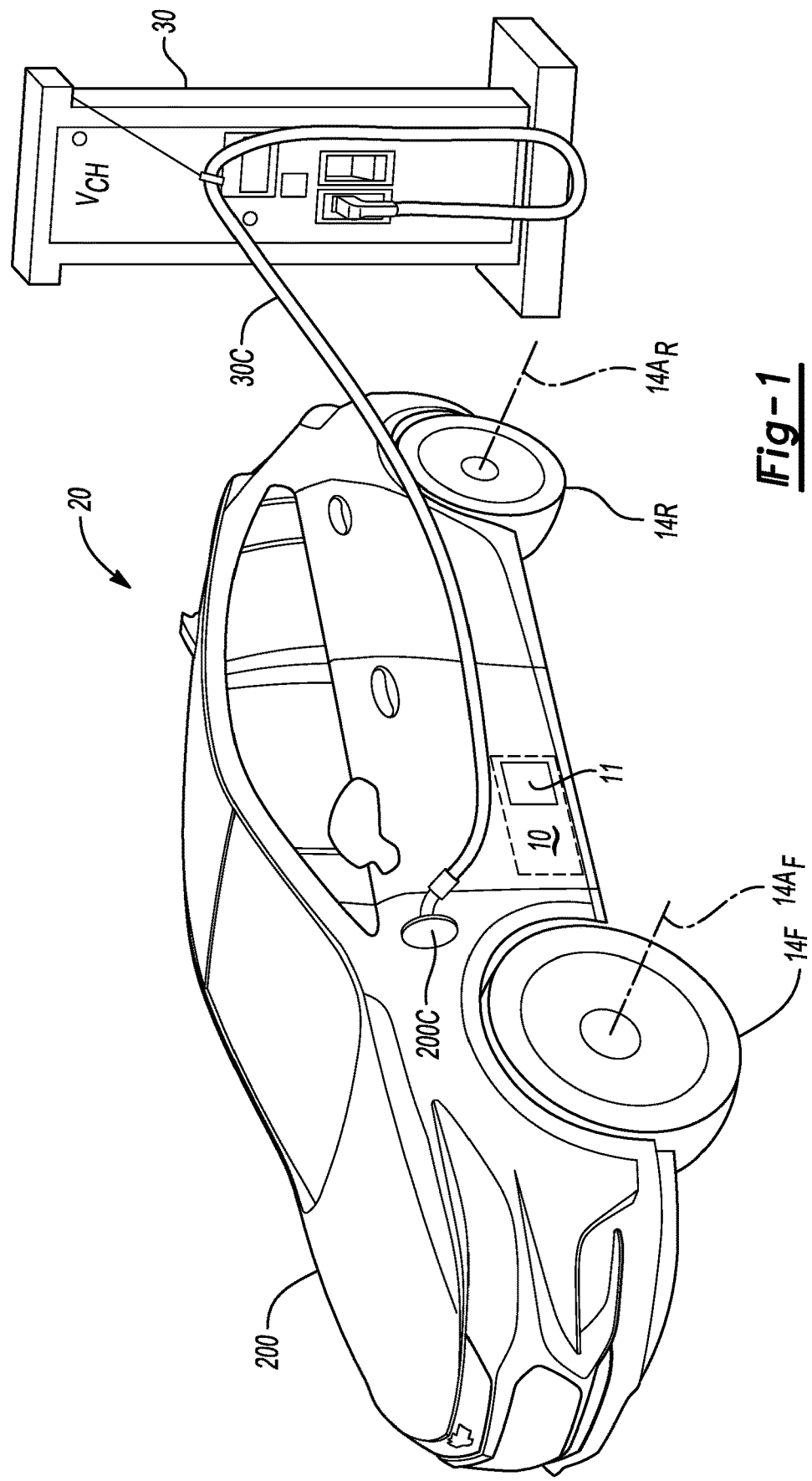
FIG. 1 is a schematic illustration of a motor vehicle undergoing a direct current fast-charging operation, with the motor vehicle having a high-voltage multi-pack battery system and three-way/two-position contactors providing mutually-exclusive series and parallel battery arrangement connections as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 3:
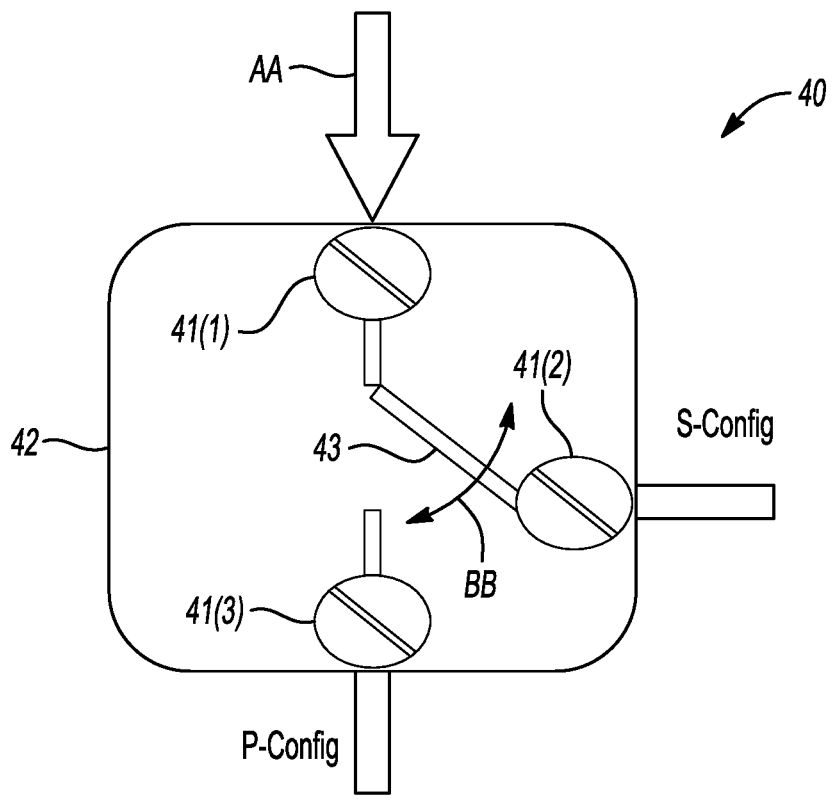
FIG. 3 is a schematic plan view of a representative three-way/two-position contactor in accordance with the disclosure.
Figures 4, 7:
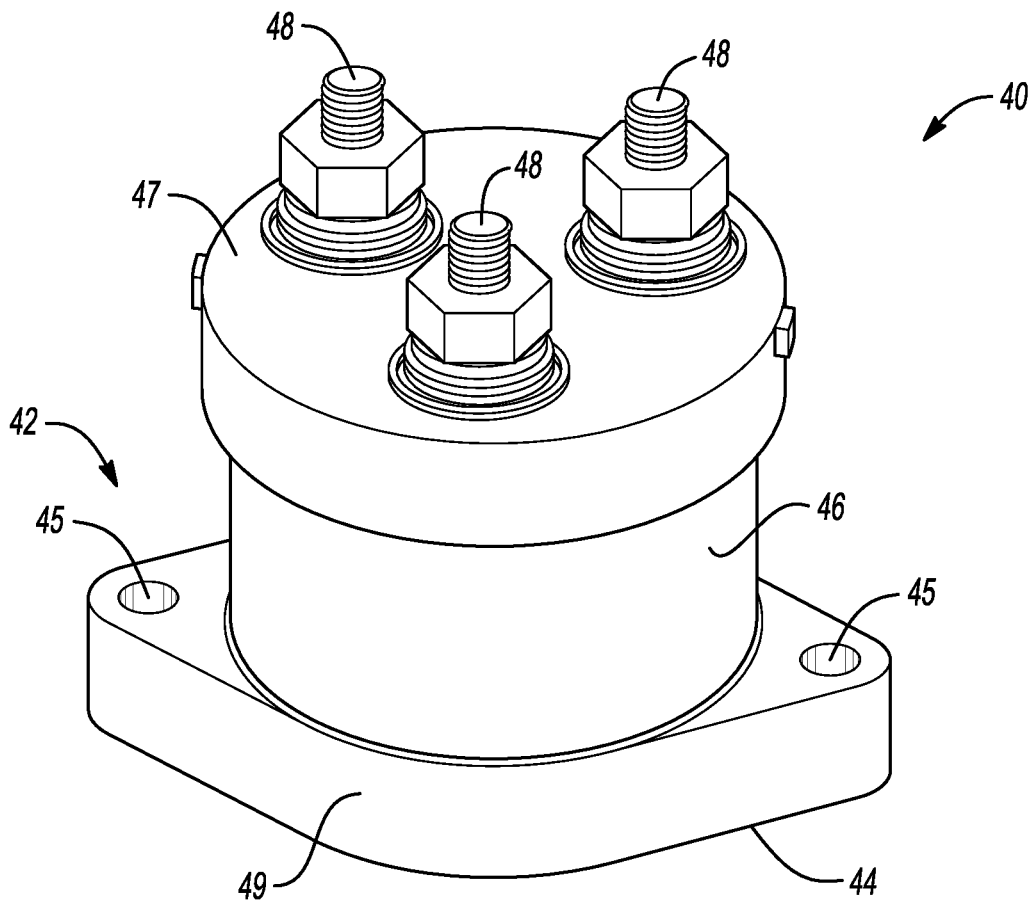
FIG. 4 is a schematic perspective view illustration of the three-way/two-position contactor shown in FIG. 4.
FIG. 7 is a truth table depicting ON/OFF states of the various switches shown in FIG. 4.
Figure 5:
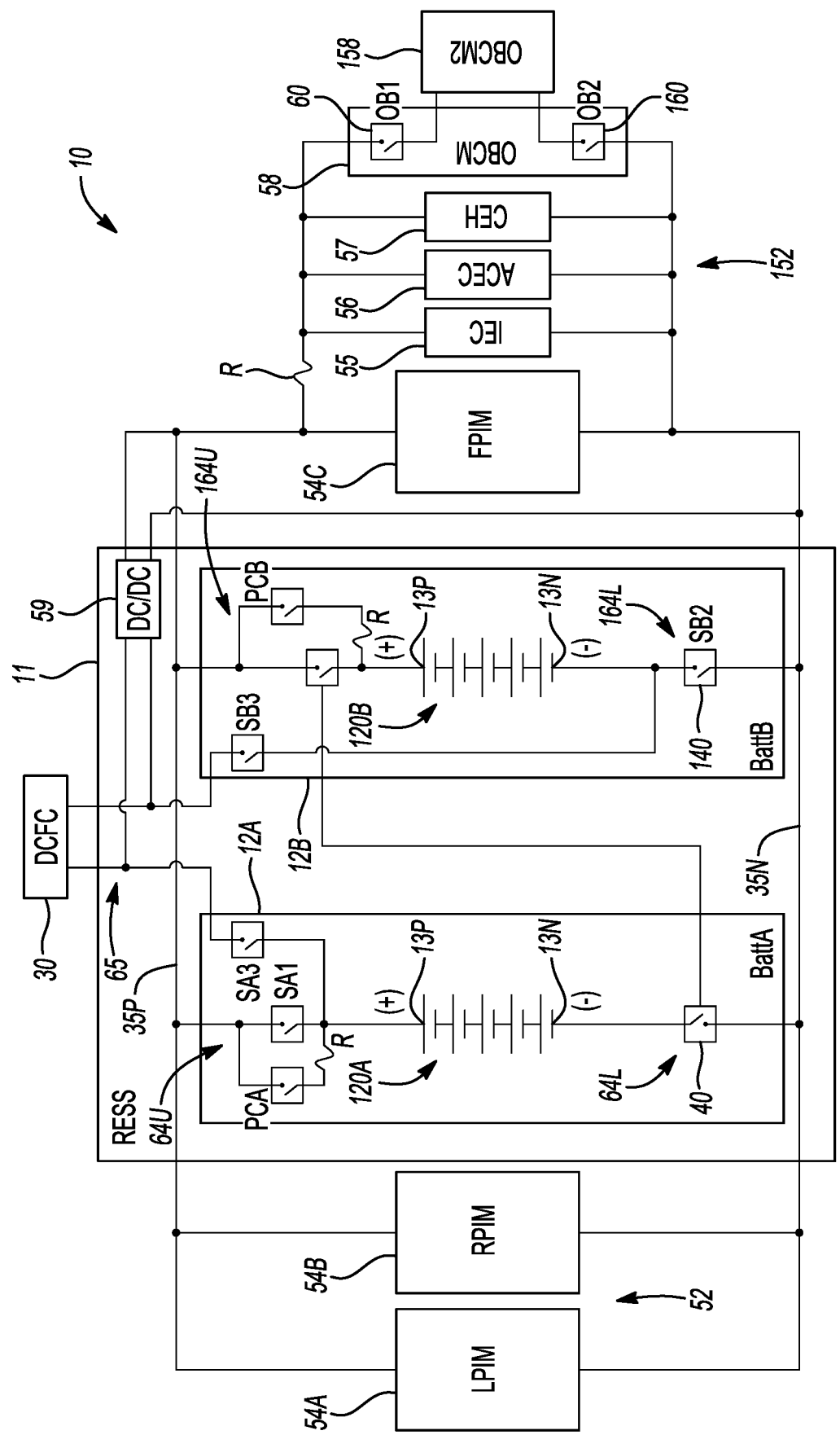
FIGS. 5 and 6 are schematic eight-switch and nine-switch circuit diagrams for implementing portions of an electric propulsion system usable as part of the motor vehicle of FIG. 1.
Figure 6:
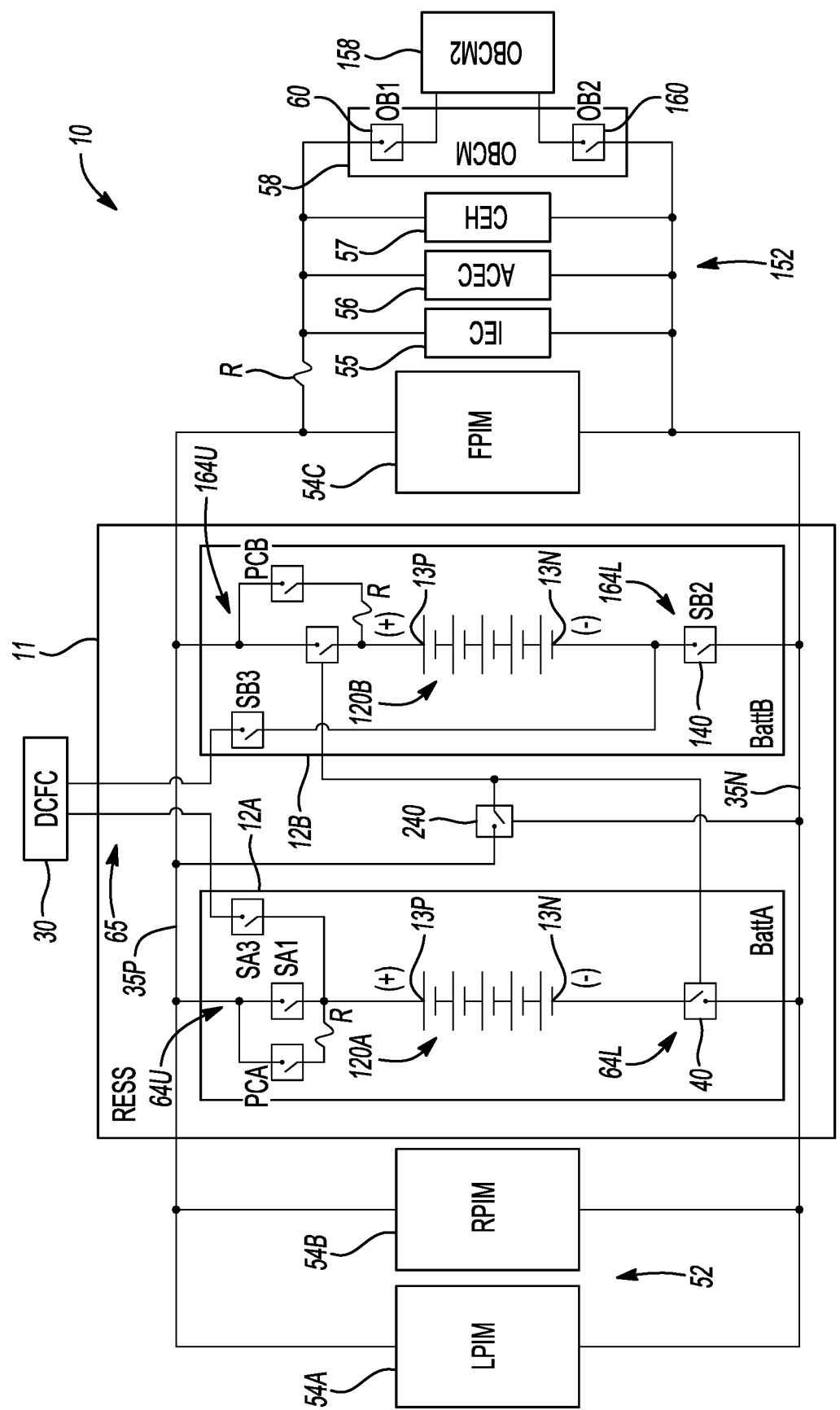

Referring to the drawings, wherein like reference numbers refer to the same or like components in the several Figures, an electric powertrain 10 is shown in FIG. 1 that includes a multi-pack battery system 11, exemplary embodiments of which are presented in more detail in FIGS. 5 and 6. The electric powertrain 10 includes at least two three-way/two-position contactors 40, a representative embodiment of which is depicted in FIGS. 3 and 4 and described below, to enable mutually-exclusive series and parallel battery connections in the scope of the present disclosure.

The electric powertrain 10 may be used as part of a motor vehicle 20 having a vehicle body 200. In such an embodiment, the vehicle body 200 is connected to a set of road wheels 14F and 14R, with the suffixes "F" and "R" in this instance referring to the front and rear positions of corresponding drive axles 14A$_F$ and 14A$_R$ on which the road wheels 14F and 14R are respectively disposed. The motor vehicle 20 may be alternatively embodied as a marine vessel, aircraft, rail vehicle, robot, or other mobile platform, and therefore the present teachings are not limited to vehicular applications in general or automotive vehicles in particular.

The motor vehicle 20 is shown undergoing a direct current fast-charging (DCFC) operation. During such an operation, the multi-pack battery system 11 is electrically connected to an off-board DCFC station 30 via a vehicle charging port 200C coupled within the motor vehicle 20 to the battery system 11. The battery system 11 of the present disclosure uses multiple battery packs, with two such battery packs shown in the non-limiting exemplary embodiments of FIGS. 5 and 6 as respective first and second battery packs 12A and 12B. The battery system 11 may be variously embodied as a multi-cell lithium ion, zinc-air, nickel-metal hydride, or other suitable battery chemistry configuration without limitation.

The exemplary power architectures described herein enable an improved utilization of a charging voltage from the DCFC station 30 at different charging voltage levels, with the charging voltage abbreviated "$V_{CH}$". For instance, the motor vehicle 20 may be propelled at a lower first voltage level of about 400-500V in some embodiments, and then automatically reconfigured during a charging operation to receive the charging voltage ($V_{CH}$) at a higher second voltage level. In the exemplary two-pack configuration, the higher second voltage level is double the lower first voltage level, e.g., 800-1000V in the example embodiment in which each of the battery packs 12A and 12B has a corresponding voltage capability of about 400-500V. Other voltages may be contemplated for different applications, with the term "high-voltage" therefore being relative to the application. For instance, assuming 12-15V auxiliary/low-voltage levels, the term "high-voltage" could entail voltage levels of 18V or more, with practical propulsion applications typically being 60V or more, up to and including the 400V-per-pack or greater voltage noted above. In any or all of the contemplated embodiments, the three-way/two-position contactors 40 of FIGS. 3 and 4 work within this framework to reduce instances of electrical faults, reduce part count, and provide various other advantages as described below.

As will be appreciated by those of ordinary skill in the art, the various propulsion modes enabled by the architectures described herein may include all-wheel drive ("AWD"), front-wheel drive ("FWD"), or rear-wheel drive ("RWD") depending on available battery power, control configurations, and other relevant mechanical and electrical factors. Likewise, the present teachings may be used to enable independent propulsion of the road wheels 14R at the rear of the motor vehicle 20 relative to each other, i.e., a left-side/driver-side road wheel 14R and a right-side/passenger-side road wheel 14R may be independently powered by the electric powertrain 10.

While propulsion at the higher/combined voltage level of the first and second battery packs 12A and 12B operating in a series battery configuration is not precluded by the present teachings, such a configuration would require special high-voltage construction of the various power electronic components, electric motors, power inverters, and other propulsion components connected to the battery system 11, and therefore the present disclosure focuses on the more practically implemented parallel propulsion modes as described below. Charging occurs at either the higher/series-combined or lower/parallel-combined voltage levels, e.g., depending on the available maximum charging voltage from the charging station 30.

In FIG. 1, the charging port 200C is internally connected to a DC charge connector (not shown) of/coupled to the battery system 11, with the charging port 200C connected to the charging station 30 using a length of high-voltage charging cable 30C. Although not depicted in FIG. 1, but well understood in the art, a terminal end of the charging cable 30C configured to connect to the charging port 200C may be embodied an SAE J1772 or another suitable charge connector. However, the present teachings are independent of the particular charging standard ultimately employed in a DCFC operation, and therefore the above-noted examples are merely illustrative.

Figure 2:
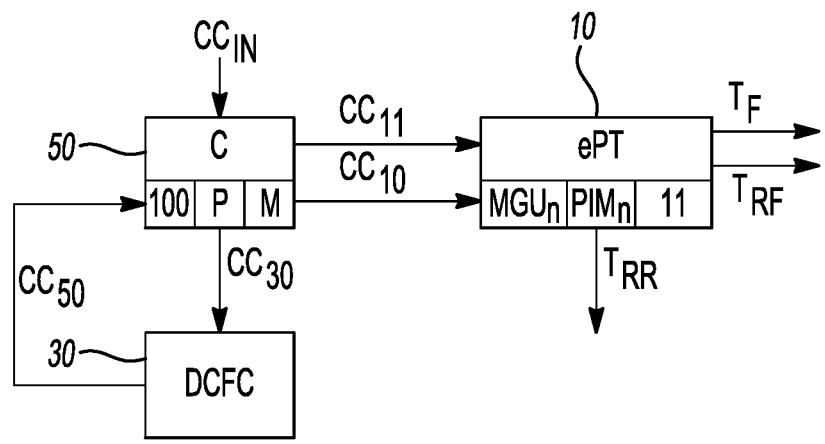
FIG. 2 is a schematic flow diagram depicting a controller of the motor vehicle of FIG. 1 in communication with a DC fast-charging station and an electric powertrain of the motor vehicle.

Referring briefly to FIG. 2, an electronic control unit or controller (C) 50 is configured to control ongoing powerflow and charging operations aboard the motor vehicle 20 of FIG. 1 or another mobile system. The controller 50 is in communication with the various controlled components of the electric powertrain (ePT) 10 via a suitable communications framework and protocol, e.g., a controller area network (CAN) bus. The controller 50 is configured to receive input signals (arrow $CC_{IN}$) from sensors or other control units (not shown) of the motor vehicle 20 and/or in communication therewith, to execute computer-readable code/instructions 100 in response to the input signals (arrow $CC_{IN}$), and to output various signals to the electric powertrain 10, the battery system 11, or to the DCFC station 30 as corresponding signals (arrow $CC_{10}$, arrow $CC_{11}$, and arrow $CC_{30}$). The controller 50 may also receive charging feedback signals (arrow $CC_{50}$) from the DCFC station 30 during ongoing charging operations, as will be appreciated by those having ordinary skill in the art.

In the broad scope of possible operations, the input signals (arrow $CC_{IN}$) may include a wide range of relevant control and feedback values, e.g., temperature, commanded and estimated operating speed, required charging power, current state of charge, etc. In response, the controller 50 may transmit the various control/output signals (arrows $CC_{10}$ and $CC_{11}$) as noted above to ensure that the electric powertrain 10 allocates front and/or rear torque (arrows $T_F$ and $T_{RF}$, $T_{RR}$) to the front and/or rear axles $14A_F$ or $14A_R$, or to the individual road wheels 14F or 14R connected thereto.

Thus, receipt of the signals (arrows $CC_{10}$ and $CC_{11}$) causes one or more (i.e., n) motor-generator units (MGUn) each coupled via a respective power inverter modules (PIMn) to a rechargeable energy storage system (RESS), i.e., the multi-pack battery system 11, to generate the indicated torques (arrows $T_F$, $T_{RF}$, $T_{RR}$). As appreciated in the art, the motor-generator units (MGUn) may be configured as high-voltage electric traction or propulsion motors, e.g., polyphase/alternating current (AC) traction motors having a concentric stator and rotor (not shown), with the rotor being connected directly or indirectly to one or more of the road wheels 14F and/or 14R.

In terms of constituent hardware configuration, the controller 50 includes a processor (P) and memory (M). The memory (M) includes tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 is programmed to execute the instructions 100 during charging and propulsion modes, as noted above, which includes performing switching control operations of the specific switches described below with reference to FIGS. 4 and 5.

Referring to FIG. 3, mutually-exclusive series and parallel battery configurations are established within the example architectures of FIGS. 5 and 6 or other electrical circuits in part using two or three two three-way/two-position contactors 40 and 140 (FIG. 5), or three such contactors 40, 140, and 240 (FIG. 6), with the reference numbers differing solely for clarity to reflect different installed positions within the battery system 11. The contactor 40 of FIG. 3 is thus representative of the contactors 140 and 240 described below. When configured and used as set forth herein, the contactor 40 eliminates the possibility of certain common electrical fault modes within the multi-pack battery system 11, such as contact welding. Additionally, the total number of switches needed to establish key circuit connections within the battery system 11 is reduced relative to simple binary switches having two terminals, with eight total high-voltage switches shown in FIG. 5 and nine total switches shown in FIG. 6, with "high-voltage" referring to voltage levels well in excess of typical 12-15V auxiliary levels.

As represented in the schematic depiction of FIG. 3, the three-way/two-position contactor 40 includes three electrical terminals 41 arranged within a contactor housing 42, with the electrical terminals 41 labeled as 41(1), 41(2), and 41(3) to indicate the different respective positions within the housing 42. A moveable contactor arm 43 is arranged within the housing 42 and controlled in the course of switching operations of the battery system 11 to pivot or move (arrow BB) between a series battery configuration (S-Config) in which terminal 41(1) is connected via the contactor arm 43 to terminal 41(2), and a parallel battery configuration (P-Config) in which terminal 41(1) is connected via the contactor arm 43 to terminal 41(3). A battery current (arrow AA) flowing through the contactor 40 during the series battery configuration is therefore conducted along a circuit path leading from electrical terminal 41(1), i.e., the base terminal, through the contactor 40, through electrical terminal 41(2), and out to the remaining circuitry of the battery system 11 as shown in FIGS. 5 and 6. The separate positions of the electrical terminals 41(2) and 41(3) thus physically precludes their interconnection via the contactor arm 43.

As will be appreciated by those of ordinary skill in the art, automotive and other operations require high-voltage electrical components to be sufficiently robust, with the housing, for example the housing 42 of FIG. 3, being resistant to intrusion of water, dirt, and debris, and capable of reliably and repeatably performing an intended function in a high-voltage operating environment. For instance, the materials of construction for the electrical terminals 41(1), 41(2), and 41(3) and the contactor arm 43 may be sealed to prevent oxidation, arcing, and the like.

An exemplary automotive-grade implementation of the three-way/two-position contactor 40 is depicted in FIG. 4. The housing 42 in this embodiment includes a base 49 defining through-holes 45 and having a flat undersurface 44, which collectively facilitates secure mounting of the contactor 40 to a planar substrate, e.g., within the multi-pack battery system 11 of the present disclosure. A contactor body 46 of a cylindrical or other application-suitable shape contains and protects the electrical terminals 41(1), 41(2), and 41(3) and associated conductors therein, may protrude from the base 49. The contactor body 46 may be connected to an end cap 47, which in turn is secured to the contactor body 46 by a set of fasteners 48. The locations of the fasteners 48 may coincide with the electrical terminals 41(1), 41(2), and 41(3) contained within the housing 42.

Referring to FIG. 5, the three-way/two-position contactors 40 of FIGS. 3 and 4 are used as part of the multi-pack battery system 11 to establish mutually-exclusive series and parallel connections, i.e., the respective S-configuration and P-configuration, of first and second battery packs 12A and 12B as noted above, and to preclude welded contact failure modes that could result in limp-home modes or, in some instances, a cessation of drive operations. In other words, it is impossible given the structure and function of the contactors 40 to simultaneously pass the battery current (arrow AA of FIG. 3) through the electrical terminals 41(2) and 41(3). As a further benefit, the use of a single contactor 40 at the indicated locations in FIG. 5 reduces the number of total high-voltage switches in the battery system 11 to as few as eight (FIG. 5), with an optional nine-switch embodiment using three of the contactors 40 shown as an alternative approach in FIG. 6.

The multi-pack battery system 11 of the electric powertrain 10, which functions as a rechargeable energy storage system (RESS), includes the respective first and second battery packs 12A (BattA) and 12B (BattB) arranged between and connected to/across positive (+) and negative (−) rails 35P and 35N of a high-voltage bus. The battery packs 12A and 12B have corresponding positive (+) and negative (−) battery electrode terminals 13P and 13N, and together or alone power an electrical load 52 and/or 152.

The representative electrical loads 52 and 152 may include one or more high-voltage devices, such as but not limited to one or more power inverter modules 54A, 54B, and/or 54C, integrated power electronics (IEC) 55, an air conditioning electric compressor (ACEC) 56, a cabin electric heater (CEH) 57, one or more onboard charging modules (OBCMs) 58 and 158, and a DC-DC converter 59. When the OBCM 158 (OBCM2) is used, e.g., to selectively increase the charging rate/decrease charging time, OBCM switches 60 and 160 coupled to the positive and negative bus rails 35P and 35N may be used to selectively connect or disconnect the OBCM 158 as needed.

With respect to the power inverter modules 54A-54C, the illustrated embodiment of the present battery system 11 enables various powertrain constructions to power to a coupled mechanical load, in this case the front road wheels 14F of FIG. 1, e.g., in a front wheel drive or all-wheel drive mode, or to deliver power to the rear road wheels 14R in a rear-wheel drive or AWD mode. When powering the rear road wheels 14R, the construction of FIG. 4 enables a left rear road wheel 14R and a right rear road wheel 14R to be separately or independently energized. In such an embodiment, power inverter module 54A acts as a left power inverter module (LPIM) and power inverter module 54B acts as a right power inverter module (RPIM), each connected to a respective rotary electric machine (MGUn of FIG. 2) as part of the overall electrical load 52 and/or 152.

As will be appreciated, operation of the various power inverter modules 54A, 54B, and 54C utilize high-speed switching operations of dies of IGBTs, MOSFETs, and/or other applicable-suitable semiconductor switches each having an ON/OFF state controlled by the controller 50 via pulse-width modulation (PWM), pulse-density modulation (PDM), or another switching control technique. Likewise, auxiliary power modules such as the DC-DC converter 59 are operable for reducing a supply voltage from a level present on a high-voltage DC bus. Auxiliary voltage-level batteries (not shown) and other devices may also be connected to the battery system 11 in a full implementation, with such devices omitted from FIG. 5 for illustrative simplicity.

The respective first and second battery packs 12A and 12B have respective battery cell stacks 120A and 120B, with the particular configuration and battery chemistry of the cell stacks 120A and 120B being application-specific, as noted above. The electrical load(s) 52 are selectively connected to/disconnected using upper and lower sets of high-voltage switches 64U and 64L, in a particular combination that depends on the present or requested operating mode. Similarly, the electrical load(s) 152 shown at far right in FIG. 5 are selectively connected to/disconnected via sets of upper and lower switches 164U and 164L.

The various switches of FIGS. 3, 5, and 6 are depicted schematically for illustrative simplicity. In various embodiments, the switches may be configured as electro-mechanical switches such as contactors or relays, which operate in response to a generated field to block current flow in a particular direction. Alternatively, the switches may be configured as application-suitable solid-state switches or relays, e.g., semiconductor switches such as IGBTs or MOSFETs.

With respect to the respective upper and lower switches 64U and 64L of the first battery pack 12A, the individual upper switches 64U controlled herein include switches SA1 and SA3, along with a pre-charge switch PCA. The pre-charge switch PCA is in electrical series with a pre-charge resistor RA and connected to the positive electrode terminal 13P of the first battery pack 12A, with "PC" representing a pre-charge function as explained below. The upper and lower switches 164U and 164L of the second battery pack 12B are similarly configured and labeled, i.e., as another contactor 40, switches SB3, and pre-charge switch PCB forming the upper switches 164U and a switches SB2 forming the lower switches 164U. The lower switches 64L and the upper switches 164U respectively include the three-way/two-position contactor 40 described above with reference to FIGS. 3 and 4.

In the illustrated circuit topology of FIG. 5, therefore, the upper and lower switches 64U, 64L, 164U, and 164L are a plurality of high-voltage switches collectively configured to selectively interconnect the first battery pack 12A and the second battery pack 12B in a series battery arrangement or a parallel battery arrangement during a series battery operating mode and a parallel battery operating mode, respectively. The high-voltage switches include, in the FIG. 5 embodiment, a pair of the three-way/two-position contactors 40 each having a series connection position and parallel connection position as shown in FIG. 3, with the positions corresponding to the respective S-configured and P-configured modes of operation of the battery system 11.

As depicted in FIG. 5, a first three-way/two-position contactor 40 is arranged between the first battery pack 12A and the negative bus rail 35N. A second three-way/two-position contactor 140, identically configured to contactor 40 as mentioned above, is arranged between the second battery pack 12B and the positive bus rail 35P. In the series battery configuration, the base contactor terminal 41(1) (see FIG. 3) of the first contactor 40 located within the first battery pack 12A is connected to a corresponding contactor terminal 41(2) of the second contactor 40 in the second battery pack 12B, according to table 70 of FIG. 7 as described below. In the parallel battery configuration, the same contactor terminal 41(1) of the first contactor 40 is disconnected from the corresponding contactor terminal 41(2) of the second contactor 40 within the second battery pack 12B.

The multi-pack battery system 11 may also include the DC charge coupler 65, shown at the top of FIG. 5, which is configured to connect the battery system 11 to the offboard DC charging station (DCFC) 30 during a predetermined DC fast-charging event (see FIG. 1). In such an embodiment, the upper switches 64U of FIG. 5 may include the pre-charge switch PCA, i.e., a 2-way/2-position switch, which is arranged between the first battery pack 12A and the positive bus rail 35P. The upper switches 64U may also include a first-way/2-position switch SA1 arranged in parallel with the pre-charge switch PCA, and a second 2-way/2-position switch SA3 arranged between the first battery pack 12A and the DC charge coupler 65 as shown.

In the illustrated embodiment of FIG. 5, the plurality of high-voltage switches may also include an additional pre-charge switch, i.e., PCB, which is arranged between the second battery pack 12B and the positive bus rail 35P in parallel with the three-way/two-position contactor 40. A third two-way/two-position switch SB2 is arranged between the second battery pack 12B and the negative bus rail 35N. A fourth two-way/two-position switch SB3 is connects the DC charge coupler 65 to the negative battery electrode terminal 13N of the second battery pack 12B in this embodiment, which inclusive of the pair of three-way/two-position contactors 40 includes a total of eight high-voltage switches.

As noted above, the ON/OFF states of the eight high-voltage switches are individually controlled by the controller 50 of FIG. 2, which in turn is coupled to the high-voltage switches and configured, in response to the battery mode selection signal (part of the input signals arrow $CC_{IN}$ of FIG. 2), to selectively transition the pair of three-way/two-position contactors 40 from the series configuration to the parallel configuration, or vice versa. The mutually-exclusive switch-to-switch construction and function of the contactors 40 thus makes it impossible to short either of the first or second battery packs 12A and 12B.

Referring briefly to table 70 of FIG. 7, the ON/closed (X) states and OFF/open (O) states of the various high-voltage switches described above are depicted in table 70, with the states of the pre-charge switches PCA and PCB omitted for simplicity. When the electric powertrain 10 of FIG. 1 is in a PSA ("propulsion system active") mode, i.e., the multi-pack battery system 11 is not charging via the DCFC station 30, the switches SA1 and SB2 are commanded closed (X) and the switches SA3 and SB3 are commanded open (O). Both of the three-way/two-position contactors 40 and 140 are set to the parallel battery configuration of FIG. 3, i.e., electrical terminals 41(1) and 41(3) are interconnected ("1-3") so that the battery current (arrow AA) of FIG. 3 flows from the base electrical terminal 41(1) to the electrical terminal 41(3).

During a DCFC process in which the multi-pack battery system 11 charges at the higher voltage in the series battery configuration (DCFC-S), the respective first and second battery packs 12A and 12B are connected in series by the indicated switching states. That is, the switches SA1 and SB2 are opened, switches SA3 and SB3 are closed (X), and the three-way/two-position contactors 40 and 140 are commanded to the series battery configuration in which the base electrical terminal 41(1) is connected to the electrical terminal 41(2), thereby allowing battery current (arrow AA) of FIG. 3 to flow from terminal 41(1) to terminal 41(2), i.e., "1-2" as labeled in FIG. 7.

Likewise, when the multi-pack battery system 11 is charging at a lower single-pack voltage in a parallel configuration (DCFC-P), the respective first and second battery packs 12A and 12B are connected in parallel by the indicated switching states. In this case, switches SA1, SA3, SB2, and SB3 remain closed and the three-way/two-position contactors 40 and 140 are simply commanded to the parallel battery configuration in which electrical terminal 41(1) is connected to electrical terminal 41(3), thereby allowing battery current (arrow AA) of FIG. 3 to flow from terminal 41(1) to terminal 41(3), i.e., "1-3".

Referring briefly to FIG. 6, the eight-switch configuration of the multi-pack battery system 11 of FIG. 5 may be modified to include a third three-way/two-position contactor 240 between the respective first and second battery packs 12A and 12B. The resulting nine-switch embodiment may be used to provide similar series and parallel control options and fault-mode protection. In this alternative embodiment, when the respective first and second battery packs 12A and 12B are to be placed in series, electrical terminals 41(1) and 41(2) of the contactor 240 are connected together, terminal 41(1) of contactor 240 is connected to terminal 41(2) of contactor 140 within the second battery pack 12B, and terminal 41(2) of the contactor 240 is connected to the negative bus rail 35N. In parallel modes, terminals 41(1) and 41(3) of the contactor 240 are interconnected.

As will be appreciated by one of ordinary skill in the art, the circuit topologies noted above may be used with electric vehicles and other systems having increased high-power charging requirements. With legacy DC fast-charging infrastructure generally on the order of 300-500V, the disclosed multi-pack battery system enables use of two or more battery packs, e.g., the first and second battery packs 12A and 12B, to provide FWD, RWD, or AWD propulsion capability to the motor vehicle 20 of FIG. 1 as needed, with legacy or high-power charging both being options, and while preserving the capability of powering connected loads during charging.

In this context, the use of the three-way/two-position contactors 40 and 140 (FIG. 5) or 40, 140, and 240 (FIG. 6) facilitates reliable fault-tolerant switching between parallel and series modes to implement charging or propulsion at lower or higher voltage levels, respectively. The mutually-exclusive series and parallel positions of FIG. 2 in such topologies thus preclude connection of the electrical terminals 41(2) and 41(3), thereby reducing the population of possible failure modes within the battery system 11. These and other potential benefits will be readily appreciated by those skilled in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A battery system comprising:
a voltage bus having a positive bus rail and a negative bus rail;
a first battery pack;
a second battery pack, wherein the first battery pack and the second battery pack are arranged between and connected to the positive bus rail and the negative bus rail;
a plurality of switches collectively configured to selectively interconnect the first battery pack and the second battery pack in a series battery configuration (S-configuration) or a parallel battery configuration (P-configuration), wherein the plurality of switches includes a pair of three-way/two-position contactors each having a series connection position and parallel connection position corresponding to the S-configuration and the P-configuration, respectively;
wherein the pair of three-way/two-position contactors includes a first three-way/two-position contactor and a second three-way/two-position contactor; and
wherein the plurality of switches includes an additional pre-charge switch arranged between the second battery pack and the positive bus rail, a third two-way/two-position switch arranged in parallel with the second three-way/two-position contactor, and a fourth two-way/two-position switch arranged between the second battery pack and the negative bus rail.

2. The battery system of claim 1, wherein the first three-way/two-position contactor is arranged between the first battery pack and the negative bus rail, and the second three-way/two-position contactor is arranged between the second battery pack and the positive bus rail.

3. The battery system of claim 2, wherein an electrical terminal of the first three-way/two-position contactor is connected to or disconnected from a corresponding electrical terminal of the second three-way/two-position contactor when the first three-way/two-position contactor and the second three-way/two-position contactor are in the series connection position and the parallel connection position, respectively.

4. The battery system of claim 1, further comprising a direct current (DC) charge coupler configured to connect the battery system to an offboard DC fast-charging station during a predetermined DC fast-charging event.

5. The battery system of claim 4, wherein the plurality of switches includes a two-way/two-position pre-charge switch arranged between the first battery pack and the positive bus rail, a first two-way/two-position switch arranged in parallel with the two-way/two-position pre-charge switch, and a second two-way/two-position switch arranged between the first battery pack and the DC charge coupler.

6. The battery system of claim 1, wherein the plurality of switches, inclusive of the pair of the three-way/two-position contactors, includes a total of eight of the switches.

7. The battery system of claim 1, further comprising a controller coupled to the plurality of switches and configured, in response to a battery mode selection signal, to selectively transition the pair of three-way/two-position contactors from the series connection position to the parallel connection position, or vice versa.

8. The battery system of claim 1, wherein the first battery pack and the second battery pack each have a corresponding pack voltage of at least about 400-500V, such that the battery system in the S-configuration has a voltage capability of about 800-1000V or more.

9. An electric powertrain comprising:
an electrical load;
a battery system having:
a voltage bus, including a positive bus rail and a negative bus rail;
a first battery pack;
a second battery pack, wherein the first battery pack and the second battery pack are each arranged between and connected to the positive bus rail and the negative bus rail; and
a plurality of switches collectively configured to selectively interconnect the first battery pack and the second battery pack in a series battery configuration (S-configuration) or a parallel battery configuration (P-configuration), wherein the plurality of switches include a pair of three-way/two-position contactors each having a series connection position and parallel connection position corresponding to the S-configuration and the P-configuration, respectively; and
a controller coupled to the plurality of switches and configured, in response to a battery mode selection signal, to selectively transition the pair of three-way/two-position contactors from the series connection position to the parallel connection position, or vice versa;
wherein the pair of three-way/two-position contactors includes a first three-way/two-position contactor and a second three-way/two-position contactor; and
wherein the plurality of switches includes a second pre-charge switch arranged between the second battery pack and the positive bus rail, a third switch arranged in parallel with the second three-way/two-position contactor, and a fourth switch arranged between the second battery pack and the negative bus rail.

10. The electric powertrain of claim 9, wherein the electrical load includes at least one power inverter module (PIM) and a corresponding polyphase electric machine connected thereto.

11. The electric powertrain of claim 10, wherein the at least one PIM includes a first PIM and a second PIM, and the corresponding polyphase electric machine includes a first electric machine connected to the first PIM and a second electric machine connected to the second PIM.

12. The electric powertrain of claim 9, wherein the pair of three-way/two-position contactors includes a first three-way/two-position contactor arranged between the first battery pack and the negative bus rail, and a second three-way/two-position contactor arranged between the second battery pack and the positive bus rail.

13. The electric powertrain of claim 9, wherein an electrical terminal of the first three-way/two-position contactor is connected to or disconnected from a corresponding electrical terminal of the second three-way/two-position contactor when the first three-way/two-position contactor and the second three-way/two-position contactor are in the series connection position and the parallel connection position, respectively.

14. The electric powertrain of claim 9, further comprising a direct current (DC) charge coupler configured to connect the battery system to an offboard charging station during a DC fast-charging event.

15. The electric powertrain of claim 14, wherein the plurality of switches includes a first pre-charge switch arranged between the first battery pack and the positive bus rail, a first switch arranged in parallel with the first pre-charge switch, and a second switch arranged between the first battery pack and the DC charge coupler.

16. The electric powertrain of claim 9, wherein the plurality of switches inclusive of the pair of three-way/two-position contactors includes a total of eight switches.

17. A motor vehicle comprising:
a vehicle body;
a set of road wheels coupled to the vehicle body;
an electrical load, including a power inverter module (PIM) and a polyphase electric machine, the polyphase electric machine being connected to the PIM and to one or more of the road wheels;
a multi-pack battery system connectable to the electrical load, including:
a DC charge coupler configured to connect to an offboard DC fast-charging station during a DC fast-charging event;
a DC voltage bus having a positive bus rail and a negative bus rail;
a first battery pack;
a second battery pack, wherein the first battery pack and the second battery pack are arranged between the positive bus rail and the negative bus rail; and
a plurality of switches configured to selectively interconnect the first battery pack and the second battery pack to or from the electrical load in a series battery configuration (S-configuration) or a parallel battery configuration (P-configuration), wherein the plurality of switches includes a pair of three-way/two-position contactors each having a series connection position and a parallel connection position corresponding to the S-configuration and the P-configuration, respectively; and
a controller coupled to the plurality of switches and configured, in response to a battery mode selection signal, to selectively transition the pair of three-way/two-position contactors from the series connection position to the parallel connection position, or vice versa;
wherein the pair of three-way/two-position contactors includes a first three-way/two-position contactor and a second three-way/two-position contactor; and
wherein the plurality of switches includes an additional pre-charge switch arranged between the second battery pack and the positive bus rail, a third two-way/two-position switch arranged in parallel with the second three-way/two-position contactor, and a fourth two-way/two-position switch arranged between the second battery pack and the negative bus rail.

18. The motor vehicle of claim 17, wherein the first three-way/two-position contactor is arranged between the first battery pack and the negative bus rail, and the second three-way/two-position contactor is arranged between the second battery pack and the positive bus rail, and wherein respective electrical terminals of the first three-way/two-position contactor and the second three-way/two-position contactor are connected to each other or disconnected from each other when the first three-way/two-position contactor and the second three-way/two-position contactor are in the series connection position and the parallel connection position, respectively.

* * * * *